UNITED STATES PATENT OFFICE.

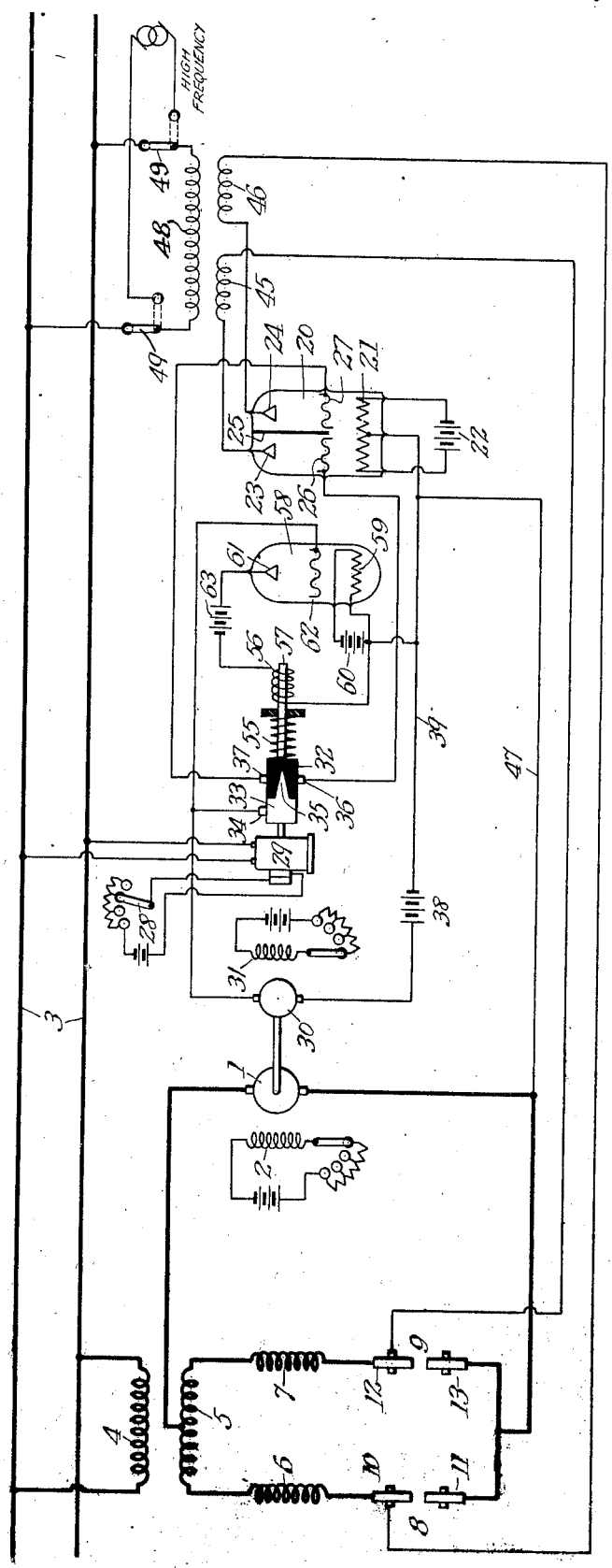

FRIEDRICH WILHELM MEYER, OF MILWAUKEE, WISCONSIN, ASSIGNOR TO THE CUTLER-HAMMER MFG. CO., OF MILWAUKEE, WISCONSIN, A CORPORATION OF WISCONSIN.

REGULATING AND CONTROL APPARATUS AND SYSTEM.

1,422,120.　　　　Specification of Letters Patent.　　Patented July 11, 1922.

Application filed March 24, 1920. Serial No. 368,330.

*To all whom it may concern:*

Be it known that I, FRIEDRICH WILHELM MEYER, a citizen of Germany, residing at Milwaukee, in the county of Milwaukee and State of Wisconsin, have invented new and useful Improvements in Regulating and Control Apparatus and Systems, of which the following is a specification.

This invention relates to regulating and control apparatus and systems.

It is particularly applicable to the regulation and control of dynamo electric machines, although not limited to such use. For example, it may also be employed for controlling the charging of batteries.

An object of the invention is to provide an improved control and regulating system employing arc discharges.

Another object is to provide improved means for converting current of one character into current of another character.

Another object is to provide improved control for open air arc discharges.

Another object is to provide an improved open air rectifier.

Other objects and advantages will appear from the description and claims.

The invention is illustrated in the accompanying drawing which shows a direct current motor receiving operating current from an alternating current source supplied through an open air discharge rectifier the discharge through which is electroionically controlled and regulated in accordance with the varying load and supply conditions to which the machine is subject, thereby to compensate for the variations.

The motor has an armature 1 and an adjustable separately excited field 2. Operating current for the motor is supplied from an alternating current line 3 through a transformer whose primary 4 is connected across the line 3. The middle of the transformer secondary 5 is connected with the upper brush of the motor, while the opposite ends thereof are respectively connected through reactance coils 6 and 7 and through open air rectifying arc discharge gaps 8 and 9 to the other brush of the motor. The open air rectifying arc discharge gap 8 comprising an anode 10 and a cathode 11 takes care of one half wave of alternating current. Likewise the open air rectifying arc discharge gap 9 comprising an anode 12 and a cathode 13 takes care of the other half wave of alternating current. The electrodes 10, 11, 12 and 13 may be in the form of discs rotating continuously during the operation of the system. If desired, the electrodes may take other forms, such as, for example, plates of proper material, form and dimension.

Reactance coils 6 and 7 serve to confine the ignition currents to the proper path, coil 6 preventing the ignition current for electrodes 10 and 11 from passing to the transformer secondary 5 and coil 7 preventing the ignition current for the electrodes 12 and 13 from passing to the transformer secondary.

As the high voltage ignition currents employed are practically always of a pulsating character, and often of very high frequency, no difficulty is experienced in confining the ignition currents to the proper path.

Normally the line voltage pulsations supplied through the transformer are not of sufficient magnitude to cause the ignition of an arc across either arc discharge path. The ignition of the arcs is controlled and regulated by an electroionic discharge valve or relay 20.

This valve 20 comprises a vessel which may be evacuated to the desired degree or filled with a suitable gas of low pressure such as, for example, mercury vapor or argon. The vessel contains a cathode 21 positioned in one end thereof. This cathode 21 may be heated to a glowing condition by current from a battery 22. The vessel also contains two anodes 23 and 24 positioned in spaced relation in the opposite end thereof. A partition 25 may be provided to prevent a discharge between the anodes 23 and 24, when, because of the size and arrangement of the vessel, these electrodes are near together. However, the partition is not always necessary. The vessel also contains two auxiliary anodes 26 and 27 which may take the form of grids, the former being positioned between the cathode 21 and anode 23, and the latter between the cathode and anode 24. Of course, other means than the battery may be used to heat the cathode 21.

The action of the electroionic valve or relay 20 is controlled and regulated by the varying load and supply conditions to which the motor is subject and this control may be exercised through a small direct current generator or tachometer machine 30. The tachometer 30 is connected to the motor shaft to be driven thereby and thus to simulate the operation thereof and is coincidently responsive to changes in speed of the motor. The tachometer has an adjustable separately excited field 31. The control of the tachometer 30 upon the electroionic relay 20 may be rendered intermittent by a contact drum 32 rotating continuously during the operation of the system.

The contact drum 32 is connected with the shaft of a synchronous motor 29 and rotates therewith. The primary of the motor 29 is connected across the line 3, while the secondary thereof includes a source of direct current and a rheostat 28 by which the relative movement of the rotor and the power factor of the motor may be adjusted. The drum is slidable along the shaft of the synchronous motor 29. The drum 32 is provided with a continuous conducting section 33 with which cooperates a brush 34 connected with one of the tachometer brushes. The other tachometer brush is connected through an opposing battery 38 with the mid point of the cathode 21 by means of a conductor 39. The other or right hand section of the drum 32 may be provided with triangular conducting strip 35 connected with conducting section 33. Two brushes 36 and 37 positioned 180 degrees apart cooperate with the conducting strip 35. The brush 36 is connected with the grid 26 and the brush 37 with the grid 27.

The circuit connected to the grid 26 and cathode 21 comprises a control or sensitive circuit for the electroionic relay 20 and controls the discharge between the anode 23 and the cathode 21. Similarly the circuit connected to the grid 27 and the cathode 21 forms a second control or sensitive circuit for the electroionic relay 20 and controls the discharge between the anode 24 and the cathode 21. A slight change in grid potential causes a greatly magnified change in the voltage of the circuit controlled thereby. The anode 23 is connected through a transformer secondary 45 to the open air anode 12, and the anode 24 is connected through a transformer secondary 46 to the open air anode 10. The two open air cathodes 11 and 13 are connected to the middle of the cathode 21 by means of a conductor 47. The two transformer secondaries 45 and 46 are associated with a common primary winding 48 connected across the line 3. The controlled circuits of the electroionic relay 20 each of which includes one of the open air rectifying arc discharge gaps are thus supplied with current. This transformer may be a step up voltage transformer for supplying the necessary ignition voltage for the open air rectifying arc discharge gaps connected in circuit with the secondaries thereof.

The alternating current for igniting the arcs across the open air discharge gaps 8 and 9 may be supplied from the same source from which operating current for the motor is derived, or it may be supplied from a separate source. If supplied from the same source from which the motor operating current is derived, the transformer primary winding 48 is connected to the alternating current line 3 by means of the switches 49 when in their full line positions. If the ignition current is to be supplied from a separate source such as the high frequency generator shown, the switches 49 may be moved from their full line to their dotted line positions, thereby connecting the transformer primary winding 48 to the high frequency generator.

The time of engagement of the brushes 36 and 37 with the conducting strip 35 determines when the sensitive circuits of the electroionic relay 20 will be closed, and consequently the time of igniting the arc current pulses across the open air arc discharge gaps. This time of engagement may be varied by varying the longitudinal position of the drum 32 with respect to the cooperating brushes 36 and 37, which may be done by hand if desired.

Such shifting by hand is especially convenient when employed in connection with the electroionic valve or relay controlling the ignition circuit of an arc discharge path through which is supplied current for the charging of batteries. When so employed there is no influence from a tachometer on the electroionic valve. The contactor in such a case is connected in the sensitive circuit of the electroionic valve which carries extremely small currents. Thus the use of contacts in the ignition circuit for the rectifier which forms a part of the control circuit of the electroionic valve is avoided. It is not necessary therefore to employ contacts in the ignition circuit.

When the electromagnetic control of the contactor is employed, a spring 55 cooperating with an electromagnet normally maintains the drum 32 in a predetermined longitudinal position with respect to the brushes 36 and 37. The electromagnet has a magnet coil 56 acting upon a core 57 connected with the drum 32 and controlled by an electroionic valve or relay 58 whose control circuit includes the tachometer 30 and opposing battery 38.

The electroionic valve 58 may comprise the usual evacuated vessel containing a cathode 59 heated by a battery 60, an anode 61 and an auxiliary anode or grid 62. The sensitive or control circuit is connected with one end of the cathode 59 and the grid 62, while the controlled circuit which includes the magnet coil 56 and a battery 63 is connected with one end of the cathode 59 and the anode 61.

The rheostat 28 is adjusted so that the relative movement of the rotor and power factor of the synchronous motor 29 is such that the engagement of contact strip 35 with the brush 36 is so timed that the sensitive circuit connected with grid 26 of the electroionic relay 20 is closed in synchronism with and at a predetermined point of alternate half waves of line current impressed through transformer 4, 5 upon the open air anode 12 and cathode 13. Consequently the sensitive circuit connected to grid 27 of the electroionic relay 20 will likewise be closed by the engagement of the contact strip 35 with the brush 37 in synchronism with and at a predetermined point of the other half waves of line current impressed between the open air anode 10 and cathode 11. Thus during the normal operation of the system, ignition voltage for the respective open air rectifying arc discharge paths is provided at a definite predetermined point in each line current half wave, whereby the gap normally impassable to the line current impulses is bridged thereby. By changing the width of the contact strip 35, the duration of closure of the sensitive circuit may be varied. Thus there may be either a momentary discharge between electrodes of the rectifier for creating an arc or the discharge may be of longer duration for supplying a supporting influence for the arc whereby the same may be maintained for a certain period. Thus the duration of the current pulsations to the motor 1 is controlled. The number of the active current pulsations to the motor 1 and the duration and magnitude thereof are however regulated in accordance with the changing conditions of load and power to compensate therefor, not only by varying the time of closure of the sensitive circuits of the electroionic relay 20 as described but also in a manner to be more fully hereinafter described whereby greater sensitiveness is obtained.

If the motor 1 decreases slightly in speed, due to changes in load, line voltage, etc., the tachometer machine, simulating the operation of the motor, also decreases in speed. The voltage generated thereby decreases and the difference in potential between the battery 38 and the tachometer increases. This increases the grid potential of the electroionic relay 58, as well as the potential of grids 26 and 27 of the electroionic relay 20 when the respective sensitive circuits thereof are closed. The latter may or may not have an effect, just as it is desired. If a change in potential of grids 26 and 27 due to the tachometer 30 is to have an effect, the relay 20 is constructed so that a slight change in grid potentials causes a greatly magnified change in the controlled circuits. The increased grid potential of the electroionic relay 58, which, acting to decrease the space charge about the heated cathode, causes a great increase in the discharge between the cathode and anode. In consequence the increased voltage impressed upon the terminals of the magnet coil 56 causes the magnet coil to increase its pull upon the core 57. The drum 37 is thereby moved to the right, thus advancing the time of closure of the respective sensitive or control circuits of the electroionic relay 20. The time during which the ignition of an arc is possible is thereby advanced. In consequence, the increased current supplied to the armature terminals of motor 1 applies the proper correction thereto.

When controlling the charging of batteries in the manner previously described the ignition voltage must be high enough to ignite the arcs under all conditions, but when controlling and regulating dynamo electric machines, this ignition voltage may be varied by the influence of the sensitive circuit on the electroionic relay 20. Thus this voltage influence provides a high degree of sensitiveness which is independent of any mechanical apparatus. This result is accomplished in the same manner as described in my copending application Serial No. 355,341, filed January 31, 1920 in which one electroionic relay determines the period during which an influence may be applied and the other controls the magnitude of the applied influence.

If the motor 1 increases slightly in speed the tachometer also increases in speed. The voltage generated by the tachometer increases and in consequence the grid potential of the electroionic relay 58 decreases. This decreased grid potential causes a decreased voltage to be impressed upon the terminals of the magnet coil 56. The magnet coil therefore exerts less pull on the core 57 whereupon, under the action of the spring 55, the drum is moved to the left. This retards or delays the time of closure of the respective sensitive circuits of the electroionic relay 20, and in consequence the time of igniting the arcs is retarded or delayed. Therefore the decreased current supplied to the armature terminals of the motor 1 applies the proper correction thereto.

The increase in speed of the motor 1 may even be so great as to cause the drum 32 to be moved so far to the left that the contact strip 35 thereof does not engage the brushes 36 and 37. In consequence the respective sensitive circuits of the electroionic relay 20 will not be closed during one or more revolutions of the drum 32. Therefore during such time no arcs will be ignited, and in consequence one or more current pulsations to the motor 1 are eliminated. The proper corrective effect is thus applied to the motor.

The currents, if any, carried by the sensitive or control circuits of the relay 20 are very minute. Consequently, it is possible to include in these circuits make and break contacts which are not subject to destructive sparking. Such contacts in the sensitive circuits therefore produce very sharply defined controlling effects in the controlled circuits of the relay 20, which controlled circuits may carry currents of considerable magnitude. Therefore, by employing controlling make and break contacts in the sensitive circuits, troublesome contacts in the controlled circuits carrying heavy currents may be avoided.

A separate source of high frequency current may be provided for the ignition circuit. If a supporting influence for maintaining the arcs is desired it is preferable and especially desirable that high frequency currents be employed in the ignition circuit. When high frequency currents are employed, the reactances 6 and 7, which may be small, very easily prevent the ignition currents from passing to the transformer secondary 5 while not interfering with the passage of the main currents induced from the line. The sharp interrupting effects in the ignition circuits produced by the contacts in the sensitive circuits also cooperate in causing the ignition currents to take the proper path.

It will be understood that the invention is not limited to A. C.-D. C. rectifiers, but may be employed with arc discharges for any known purpose.

What is claimed is:

1. A regulator for regulating a machine subject to variations in load and power conditions, having in combination an open air arc discharge rectifier for regulating the machine, and electroionic means subject to the varying conditions for controlling the arcs of said rectifier.

2. A system for regulating a machine subject to variations in load and power conditions, comprising an open air arc discharge rectifier for regulating the machine, and electroionic means subject to the varying conditions for controlling and regulating the ignition of the arcs of said rectifier in accordance with the varying conditions.

3. A regulator for regulating a machine subject to variations in load and power conditions, having in combination an open air arc discharge path through which the machine is to be regulated, electric means coincidently responsive to the varying conditions, and electroionic control means under the influence of said responsive means and controlling and regulating the time of ingition of an arc across said path in accordance with the varying conditions.

4. A regulator for regulating a machine subject to variations in load and power conditions, having in combination open air arc discharge electrodes adapted to be included in a control and regulating circuit for the machine, and electric means coincidently responsive to such variations for controlling the number of active current impulses bridging said electrodes whereby the machine is controlled and regulated.

5. A regulator for regulating a machine subject to variations in load and power conditions, having in combination a control and regulating circuit for the machine, open air arc discharge electrodes adapted to be included in the control and regulating circuit, and means including an electroionic relay under the influence of the varying conditions for regulating the duration of the current impulses bridging said electrodes in accordance with the varying conditions.

6. A system for regulating a machine subject to variations in load and power conditions, comprising a control and regulating circuit for the machine, open air discharge electrodes included in the control and regulating circuit, a tachometer coincidently responsive to the varying conditions, and means including an electroionic valve for interlinking the tachometer and said control and regulating circuit whereby the duration and magnitude of the current impulses bridging said electrodes are regulated in accordance with the varying conditions.

7. A system for regulating a machine subject to variations in load and power conditions, having in combination an open air arc discharge double wave rectifier through which the machine is regulated, means coincidently responsive to the varying conditions, and an electroionic valve under the influence of said responsive means and controlling the duration of the current impulses through the rectifier whereby the machine is regulated in accordance with the varying conditions.

In witness whereof, I have hereunto subscribed my name.

FRIEDRICH WILHELM MEYER.